US012148409B2

(12) United States Patent
Camacho

(10) Patent No.: US 12,148,409 B2
(45) Date of Patent: Nov. 19, 2024

(54) COLLABORATION PLATFORM SYSTEM AND METHOD

(71) Applicant: XLIV COLLECTIVE INC., Yonkers, NY (US)

(72) Inventor: Anthony W. Camacho, Yonkers, NY (US)

(73) Assignee: XLIV COLLECTIVE INC., Yonkers, NY (US)

( * ) Notice: Subject to any disclaimer, the term of this patent is extended or adjusted under 35 U.S.C. 154(b) by 273 days.

(21) Appl. No.: 17/708,931

(22) Filed: Mar. 30, 2022

(65) Prior Publication Data

US 2022/0319480 A1 Oct. 6, 2022

Related U.S. Application Data

(60) Provisional application No. 63/168,899, filed on Mar. 31, 2021.

(51) Int. Cl.
*G10H 1/00* (2006.01)

(52) U.S. Cl.
CPC ..... *G10H 1/0033* (2013.01); *G10H 2240/175* (2013.01); *G10H 2240/181* (2013.01)

(58) Field of Classification Search
CPC ......... G06F 3/162; G06F 3/165; G06F 3/0482
USPC .......... 700/94
See application file for complete search history.

(56) References Cited

U.S. PATENT DOCUMENTS 9,093,259 B1 * 7/2015 Quinn ................ G06F 3/04815
2013/0123954 A1 * 5/2013 Reid ...................... G05B 19/02 700/83
2013/0310122 A1 * 11/2013 Piccionielli .......... G10H 1/0058 463/2
2020/0372468 A1 * 11/2020 Lane .................... G06Q 10/101

* cited by examiner

*Primary Examiner* — Alexander Krzystan
(74) *Attorney, Agent, or Firm* — Sherman IP LLP; Kenneth L. Sherman; Steven Laut

(57) ABSTRACT

A musician collaboration system includes a memory configured to store instructions and a processor configured to execute the instructions to: receive a request for providing a feature. The request including receiving a first content file associated with the feature; transmitting a message informing the request; one of transmitting an acceptance of the request and a denial of the request; and upon the acceptance of the request, receiving and transmitting a second content file including a version of the feature.

12 Claims, 13 Drawing Sheets

FIG. 1
WWW.collaborationdirect.com
SEARCH ARTIST NAME
HOME
ABOUT
PRICING
SUPPORT
FAQ
GENRES
Hip-Hop
Rock
Country
R&B
More
C
D
LOGIN
SIGN UP

1

4

5

7

9

300

COLLABORATION PLATFORM SYSTEM AND METHOD

CROSS-REFERENCE TO RELATED APPLICATIONS

This application claims the priority benefit of U.S. Provisional Patent Application Ser. No. 63/168,899, filed Mar. 31, 2021, which is incorporated herein by reference in its entirety.

TECHNICAL FIELD

One or more embodiments relate generally to musician collaboration, and in particular a collaboration computing platform and mobile app for musician collaboration.

BACKGROUND

Most musicians and musical artists typically rely on booking agents and agencies in order to connect with other musicians and musical artists.

SUMMARY

Some embodiments provide a musician collaboration system that includes a memory configured to store instructions and a processor configured to execute the instructions to: receive a request for providing a feature. The request including receiving a first content file associated with the feature; transmitting a message informing the request; one of transmitting an acceptance of the request and a denial of the request; and upon the acceptance of the request, receiving and transmitting a second content file including a version of the feature.

These and other features, aspects and advantages of the one or more embodiments will become understood with reference to the following description, appended claims, and accompanying figures.

DETAILED DESCRIPTION

Figure 1:
FIG. 1 shows an example home webpage for a musician and artist collaboration web-based platform, according to one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Some embodiments provide a musician collaboration system that includes a memory configured to store instructions and a processor configured to execute the instructions to: receive a request for providing a feature. The request including receiving a first content file associated with the feature; transmitting a message informing the request; one of transmitting an acceptance of the request and a denial of the request; and upon the acceptance of the request, receiving and transmitting a second content file including a version of the feature.

One or more embodiments provide a computer program product for member collaboration system, the computer program product including a computer readable storage medium having program instructions embodied therewith, the program instructions executable by a processor to cause the processor to: receive, by the processor, a request for providing a feature, the request including receiving a first content file associated with the feature; transmit, by the processor, a message informing the request; transmit, by the processor, one of an acceptance of the request and a denial of the request; and upon the acceptance of the request, receive and transmit, by the processor, a second content file including a version of the feature.

Some embodiments provide a global marketplace for collaborators that provides a platform for musical artists that consolidates and monetizes the act of collaborating musical features (voice, instrument, lyrics, composition, etc.) between artists in exchange for serving as a brokerage platform bridging the gap between the smallest and biggest artist in the world. One embodiment provides a web-based platform and mobile app that offers access to a demographic of artistic individuals who have often may have felt left out. One embodiment provides a website/app that properly encompasses uploading of wav files and the processing of the associated financial transactions. One embodiment provides for build-up of an index of artists up to featuring every artist in the world, and may become the golden standard of its kind. Some embodiments may provide for one million or more subscribers on a platform and mobile app and may be responsible for facilitating the next generations biggest hot 100's, YOUTUBE®, SOUNDCLOUD®, and radio hits.

One or more embodiments aim to become a platform for the first and only global marketplace for musical features via the Internet. One embodiment provides a bridge for the gap between established artists and aspiring artists by providing a platform that gives musical dreamers instant access to a possible musical feature from any artist of their choosing with ease, such as a few clicks of an interface button. One embodiment provides a successful artist with a platform where they can remotely earn revenue in collaboration with ease, such as a few clicks of an interface button.

One embodiment provides a platform that values and provides an opportunity to increase the likelihood little known artists dreams may come to fruition by providing them with the two most prominent assets someone can have in the music industry: access to other artists and opportunity for collaboration. Some embodiments provide users to reach the milestone of generating transactional credits or fees from the exchanging of musical verses via the platform. One embodiment provides to have every artist in the world featured on the platform providing a massive selection of artists to collaborate with.

The music industry from which one or more embodiments will become a pivotal part of a multi-billion dollar industry that may never disappear. Music may forever be a part of people's inner being and as long as that persists, it shall remain a highly profitable industry. One or more embodiments provide a new market in the music industry. Conventional collaboration between music artists consists of booking agents and agencies. Booking agents wear many hats and simply cannot prioritize a collaboration from an unknown artist enough to provide the service as quickly and efficiently as one or more embodiments, which can provide an artist to become their own "booking agents" in regards to features.

One embodiment provides that a target audience is composed of two different musical demographics. The first is an already successfully established artist that is drawn to the platform by the opportunity of being able to generate large sums of revenue instantaneously from the comfort of their home studios via the platform. The second demographic comprises all aspiring artists that have vivid dreams of becoming the next musical sensation and who will gladly join the platform (e.g., via an annual credit or fee, sponsorships, advertising, etc.) in exchange for instant access to potentially collaborate with the established artists, which may include their music industry idols.

FIG. 1 shows an example home webpage 1 for a musician and artist collaboration web-based platform, according to one or more embodiments. In some embodiments, the platform includes known and available technology including functional graphical user interfaces (GUIs) including one or more of selection buttons, dropdown menus, search bars, user profile sections, uploading/downloading of files (e.g., text, way, pdf, jpg, etc.), financial transactions, etc. In some embodiments, the example home page 1 may include a search bar for a musical artists or professionals name, for which partial names, also known as (AKA) names, stage names, birth names, etc., are searchable across databases that store profiles for a multitude of artists that are available for requested features (e.g., vocals, instrumentals, lyrics, composition, mixing, arrangement, mastering, etc.). The home page also includes login and signup buttons/tabs (to start using the platform for purchasing features, collaborating, or providing features for credits (e.g., crypto token credit, fees, etc.), and genre (e.g., pop, hip-hop, rock, country, R&B, etc.) buttons/tabs (including the most popular genres and newly created genres if an artists' genre does not currently exist (for new styles of music)). Additionally, featured artists may be prominently displayed, which may be well known and famous musical artists. In some embodiments, selection of a genre button/tab opens up or directs the user to the biggest, most popular or most successful artist signed up on the platform for that particular genre. In one or more embodiments, the photograph on the home page may be a promoted artist based on most features used by other artists, biggest current hits, paid for promotions, most popular searched for, etc.

Figure 2:
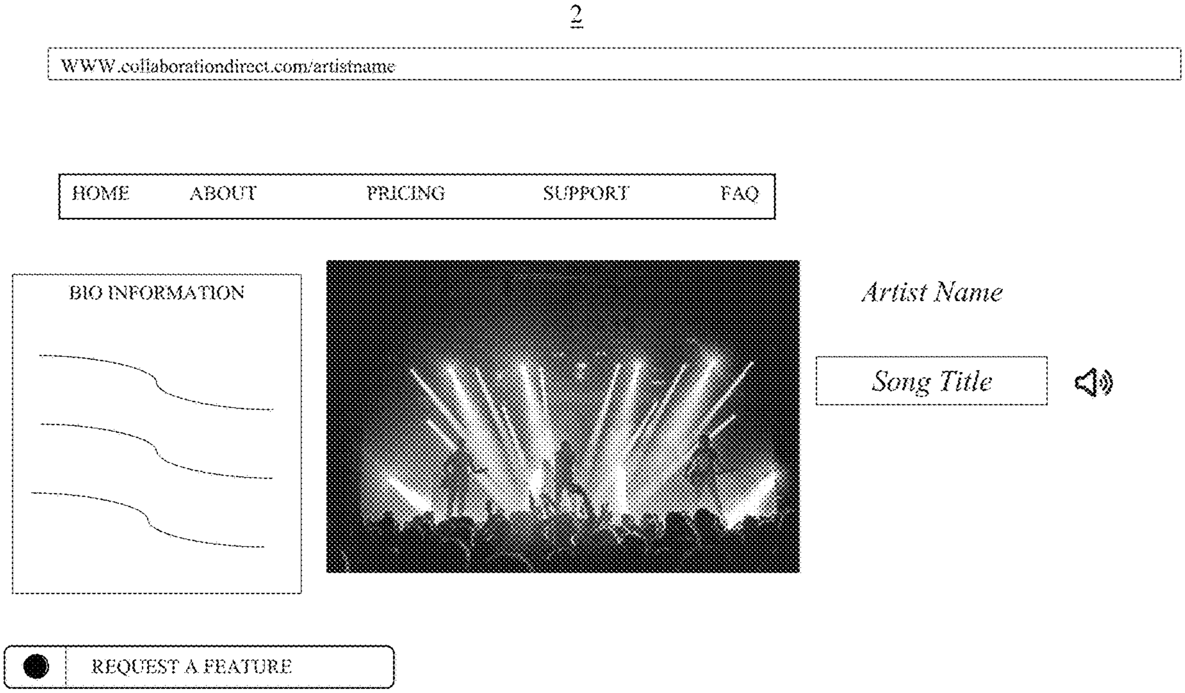
FIG. 2 shows an example musical artist webpage for a musician and artist collaboration web-based platform, according to one or more embodiments.

FIG. 2 shows an example musical artist webpage 2 for a musician and artist collaboration web-based platform, according to one or more embodiments. The example musical artist webpage 2 is the webpage that users arrive at or are directed to when they select (e.g., mouse click using a pointing device, a touch on a touch screen, a verbal command via a microphone, etc.) an artist that they desire to collaborate with. The example musical artist webpage 2 includes profile information including a bio, photos, discography, chart information, example features, music, songs, lyrics, references, etc. On the example musical artist webpage 2, example features (e.g., songs, tracks, music, etc.) may be played through the user's computer, cell phone, tablet, etc. by selecting the sound icon. In some embodiments, the song title, music title, etc. may start playing automatically if a setting is selected in the user's settings. A button or selection for requesting a feature may be chosen by the user to start a feature request for the particular artist of the example musical artist webpage 2.

Figure 3:
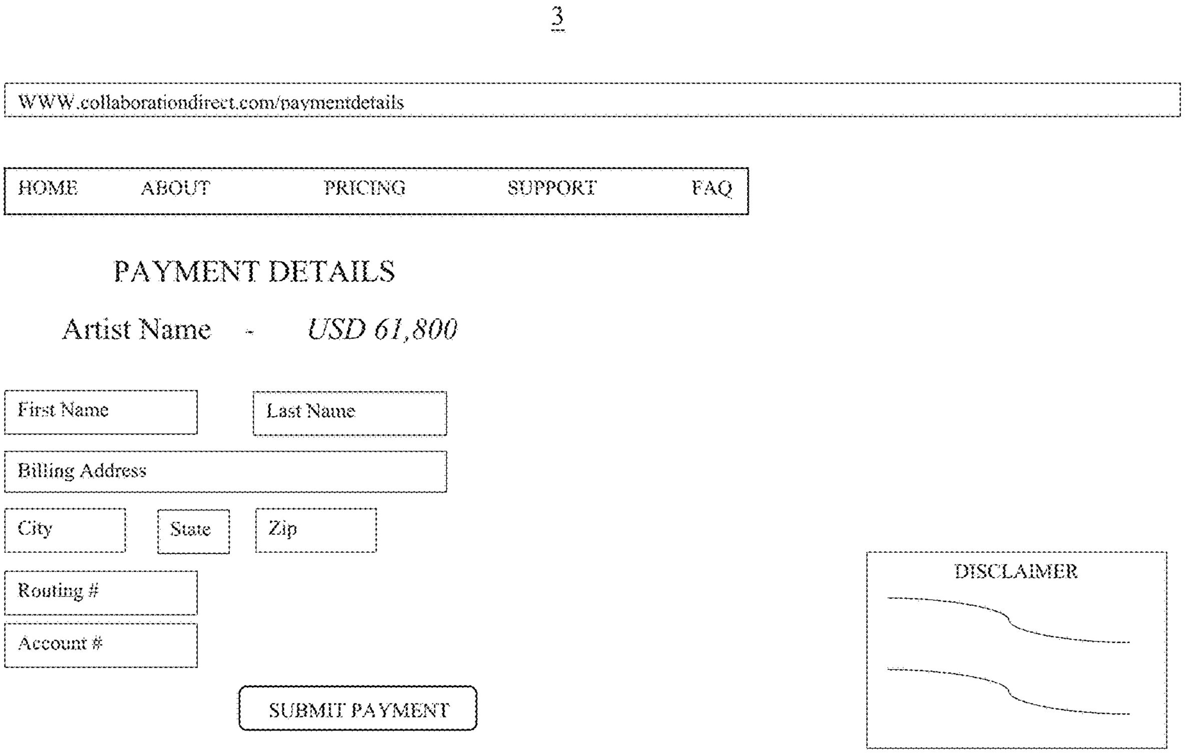
FIG. 3 shows an example payment details webpage for a musician and artist collaboration web-based platform, according to one or more embodiments.

FIG. 3 shows an example payment details webpage 3 for a musician and artist collaboration web-based platform, according to one or more embodiments. The example payment details webpage 3 informs the user of the credits or fees (e.g., crypto token credit, currency fees, etc.) that the artist charges for the feature(s), which includes the percentage (e.g., 3%, etc.) that the platform also collects for the service credits or fees. The credits or fees would be collected from the requesting user's checking account or cryptocurrency wallet. The disclaimer explains the policies and other legal information, for example, refund policies, the platform does not guarantee the artist's feature(s), etc. Once a user completes the requested information, the submit payment button or selection inputs the information and the platform attempts to collect the credits or fees for the transaction using known technologies. Once the payment is confirmed, the user is taken to a payment verification webpage of the platform (FIG. 4).

Figure 4:
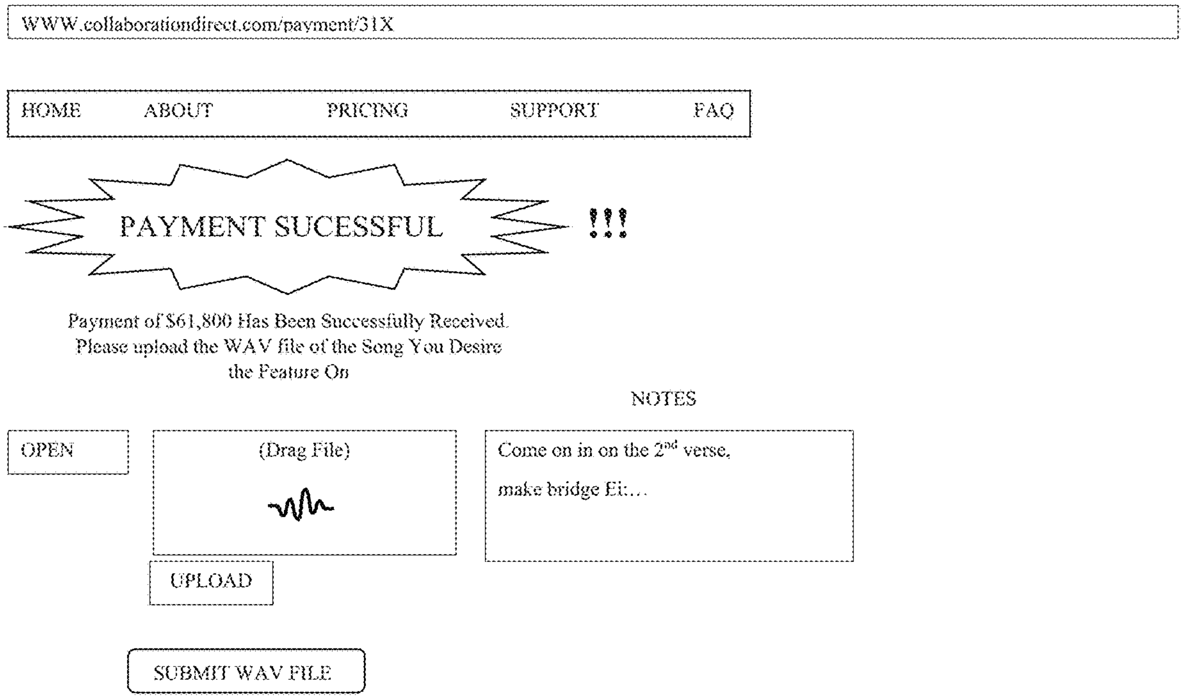
FIG. 4 shows an example payment verification webpage for a musician and artist collaboration web-based platform, according to one or more embodiments.

FIG. 4 shows an example payment verification webpage 4 for a musician and artist collaboration web-based platform, according to one or more embodiments. The example payment verification webpage 4 shows that the example payment from FIG. 3 has been successfully received. Once the payment is confirmed (e.g., successful deposit according to policy), the user uploads a file for applying the feature(s). Instructions are provided for the user to upload a way (or other accepted file formats) file for the music or song that the feature(s) is desired for. The way file may be dragged and dropped or opened and uploaded from a computing device. The notes are for the user artist to provide information for the artist providing the feature, such as where in the song they desire the feature(s), etc. Once the user submits the file by clicking on or selecting the button (e.g., submit way file), the user will be requested to confirm that the file desired to be uploaded is correct or not. Once confirmed, the file is uploaded. This confirmation is to help prevent mistakes with wrong files being uploaded.

Figure 5:
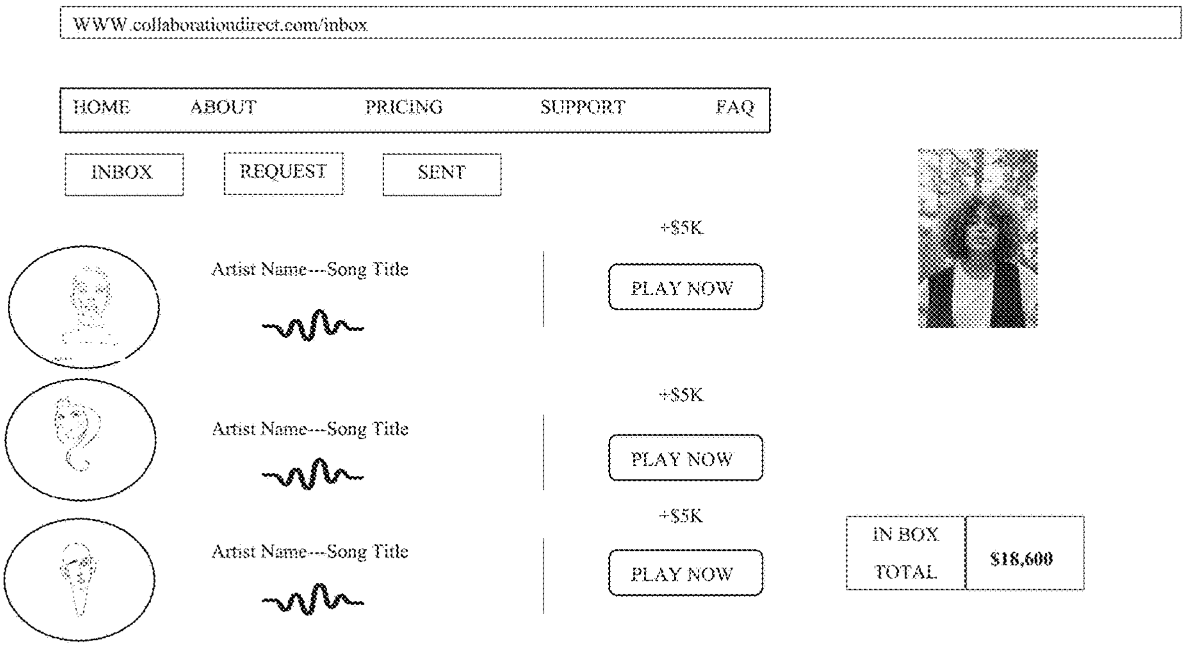
FIG. 5 shows an example user inbox webpage for a musician and artist collaboration web-based platform, according to one or more embodiments.

FIG. 5 shows an example user inbox webpage 5 for a musician and artist collaboration web-based platform, according to one or more embodiments. The example user inbox webpage 5 refers to the artist's inbox where they can view requests that other artists have sent them and also the requests that they have sent to other artists. On the example user inbox webpage 5 the artist can listen to the requesting artists song (e.g., MP3 format, etc.) to determine if it is a song/music they are willing to be featured on. The example user inbox webpage 5 shows images for artists requesting features (which are also links to the requesting artist's profiles), artist name and title of the song the requesting artist is seeking a feature(s) for. In one example embodiment, the artist receiving the request would click on or select the song or link to the requesting artist in order to accept or deny the feature request. The play now button or selection object provides playing of the requesting artists demo song (e.g., an MP3 format, etc.). The fee (or credit) shown is a display of the fees (or credits) the requesting artist has already paid for requesting the feature(s). The total fees in the inbox are also displayed, which is the received credit or fees minus the service credit or fees (e.g., 7%, etc.). In one embodiment, the artist can only receive the uploaded way file once they click or select on the request and accept the feature.

Figure 6:
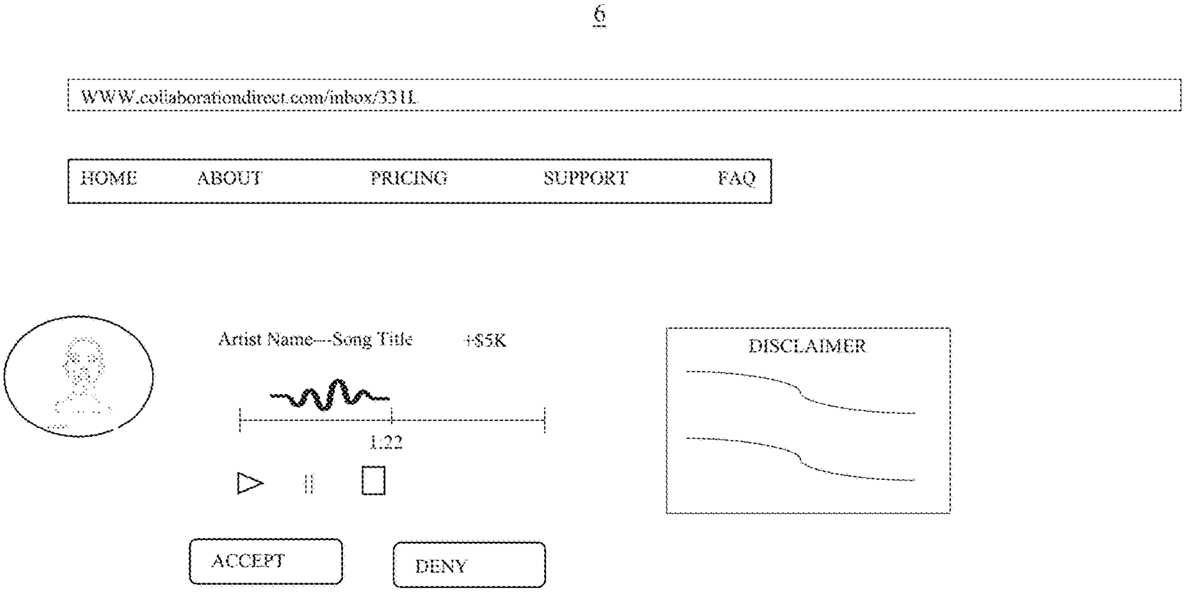
FIG. 6 shows an example request confirmation webpage for a musician and artist collaboration web-based platform, according to one or more embodiments.

FIG. 6 shows an example request confirmation webpage 6 for a musician and artist collaboration web-based platform, according to one or more embodiments. The example request confirmation webpage 6 is landed on by the artist when they click or select the link to a requesting artists song/music. The artist may play, stop, pause the song/music on this webpage. Once the artist chooses to accept the request by clicking on or selecting the accept button/object, they are provided permission to download the way file that the requesting artist uploaded. The artist may then complete their featured portion of the song/music. The artist is provided a window (e.g., three weeks, etc.) to complete their requested feature and to send back to the requesting artist. In some embodiments, if the artist does not complete their requested feature within the window, they will not receive payment and the requesting artist will be reimbursed. In one or more embodiments, if the artist denies the request, the request is deleted and the requesting artist is reimbursed minus the service credit or fee (e.g., 3%), etc. In some embodiments, the artist and requesting artist may have several takes and interim versions of the feature added to the song/music and may submit to another artist/user, such as a producer, mastering professional, etc., for refinement.

In one or more embodiments, if the requesting artist accepts the feature, the way file is automatically downloaded to the requesting artist and the artist providing the feature is compensated minus the service credit or fee (e.g., 7%). If the requesting user is not satisfied with the completed feature and denies the finished product, the requesting artist is reimbursed minus the service credit or fees (e.g., 7%) and the requested artist will not be compensated. In some embodiments, a disclaimer is displayed on the page that informs the artist/user that the requests are documented and may be used against them if they plagiarize or commit copyright infringement of this artist, etc.

Some embodiments may include advertisements for sponsors of artists. In these embodiments, the artists may receive compensation on click throughs. One embodiment may provide that the sponsor of the advertisement pays the service credit or fees for the artist in exchange for being able to post their advertisement on the profile page (or other page). One or more other embodiments may have various different layouts than in FIGS. 1-6 along with the described functionalities. For example, other promotional advertisements or announcements may be placed on different pages, such as new songs, new albums, new signings, instrument products, recording products, production products, etc.

Figure 7:
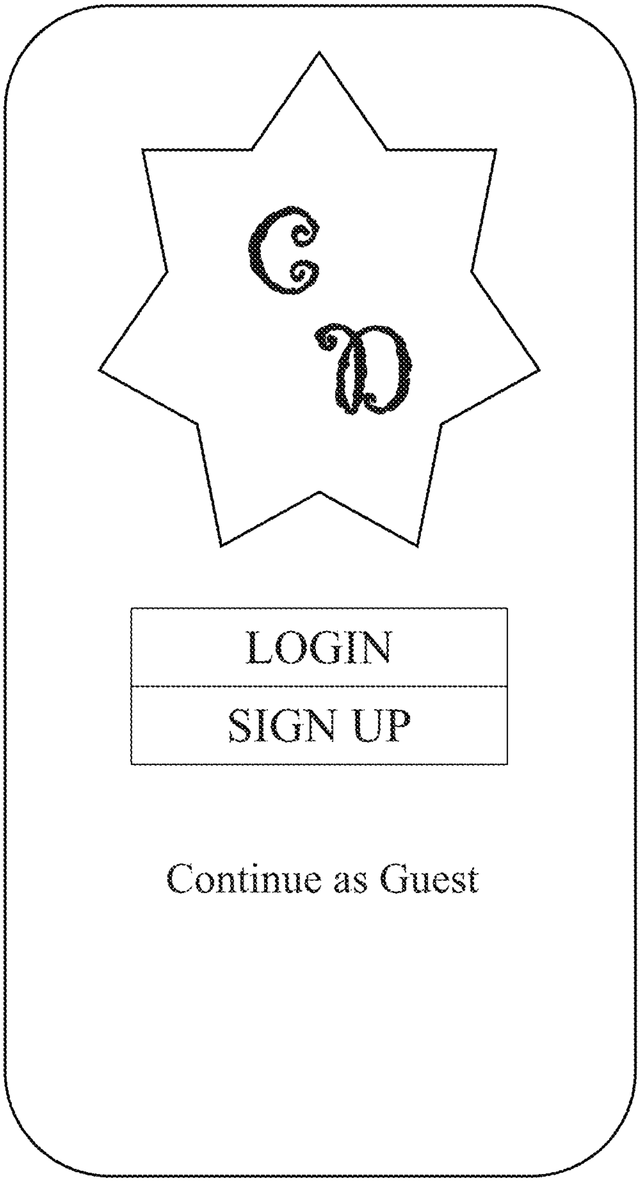
FIG. 7 shows an example launch page for a musician and artist collaboration mobile app, according to one or more embodiments.

FIG. 7 shows an example launch page 7 for a musician and artist collaboration mobile app, according to one or more embodiments. The example launch page 7 provides for signing in or signup for the platform via a mobile app. The mobile app will have the same features as the platform pages in FIGS. 1-6, but limited in functionality due to use of a mobile device (e.g., smart phone, etc.). For example, artists/users may logon and search for other artists, view their pages, visit their own inbox where they may accept or deny feature requests, check compensation, etc. In one or more embodiments, once the artist accepts a request, they would need to use a computer (e.g., a desktop, laptop, etc.) to download a way file. On the mobile app the artists would not be able to send a request unless they had functionality to upload a way file, which may not be possible due to size of the file and format.

Figure 8:
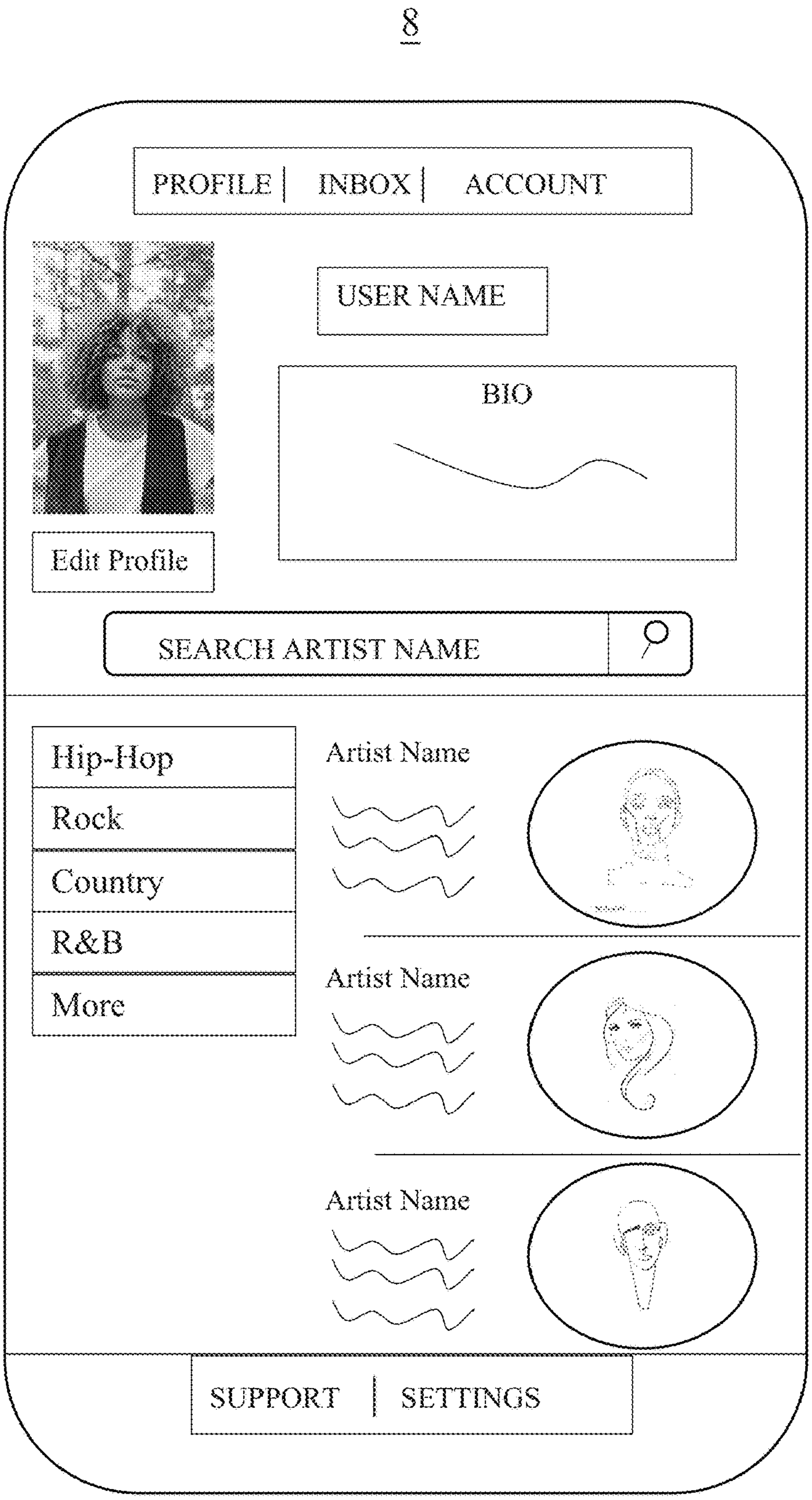
FIG. 8 shows an example home page for a user for a musician and artist collaboration mobile app, according to one or more embodiments.

FIG. 8 shows an example home page 8 for a user for a musician and artist collaboration mobile app, according to one or more embodiments. Once the artist/user logs in, the example home page 8 includes genre selections, a search bar for searching various artists/users, profile photo and edit capabilities, bio, and different promoted artists photos and bios or current news text and/or graphics. Different tabs are available to direct the artist/user to other app pages, such as profile, inbox, account, support, settings, etc.

Figure 9:
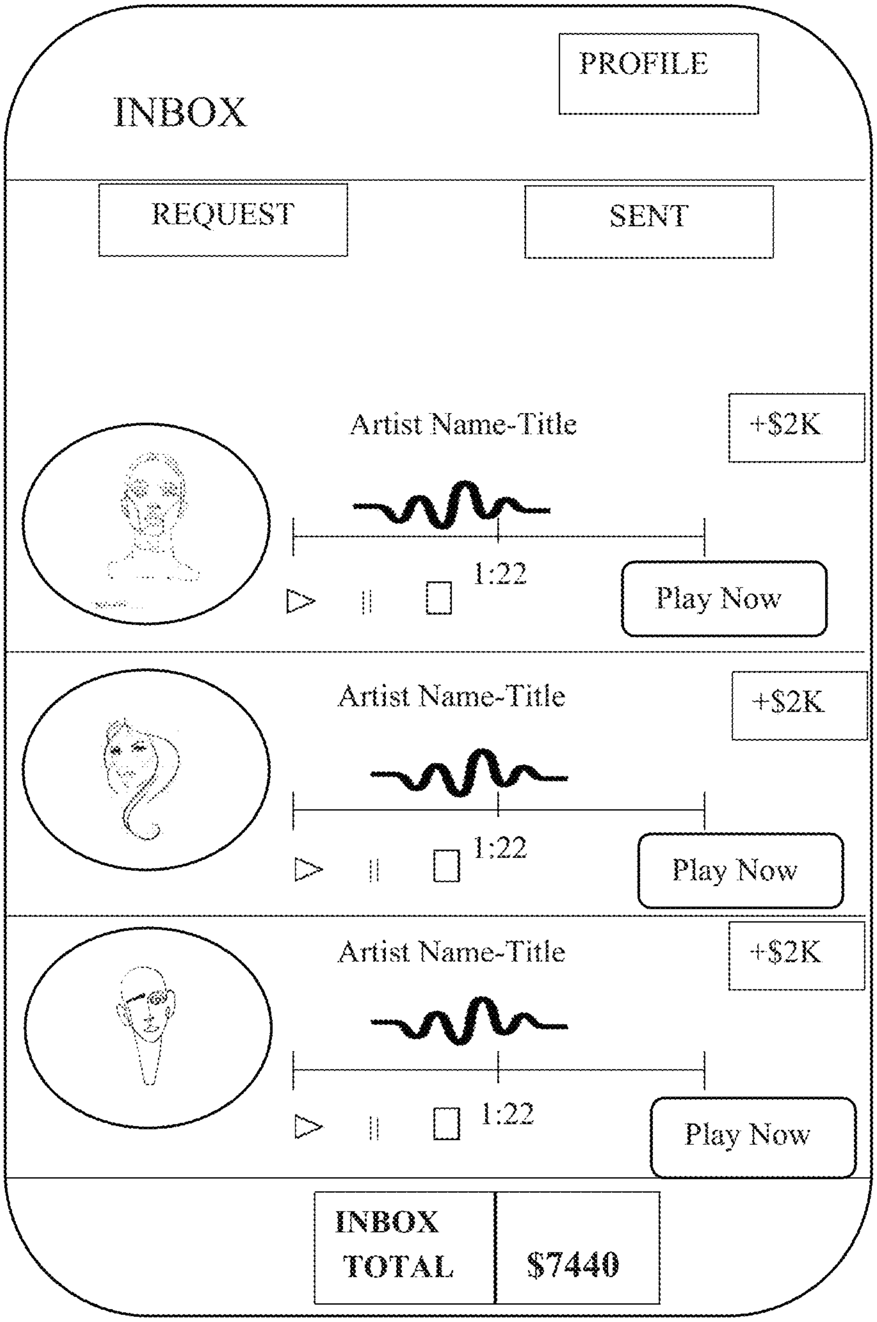
FIG. 9 shows an example inbox page for a user for a musician and artist collaboration mobile app, according to one or more embodiments.

FIG. 9 shows an example inbox page 9 for a user for a musician and artist collaboration mobile app, according to one or more embodiments. In some embodiments, the example inbox page 9 includes a profile tab to direct the artist/user to the profile page. The example inbox page 9 also includes a request tab and sent tab to direct the artist/user to a page showing a feature request page and to show feature requests already sent. The example inbox page 9 may include a similar scaled down page as with the example user inbox webpage 5 (FIG. 5) as described above (but limited to functions depending on the mobile device).

Figure 10:
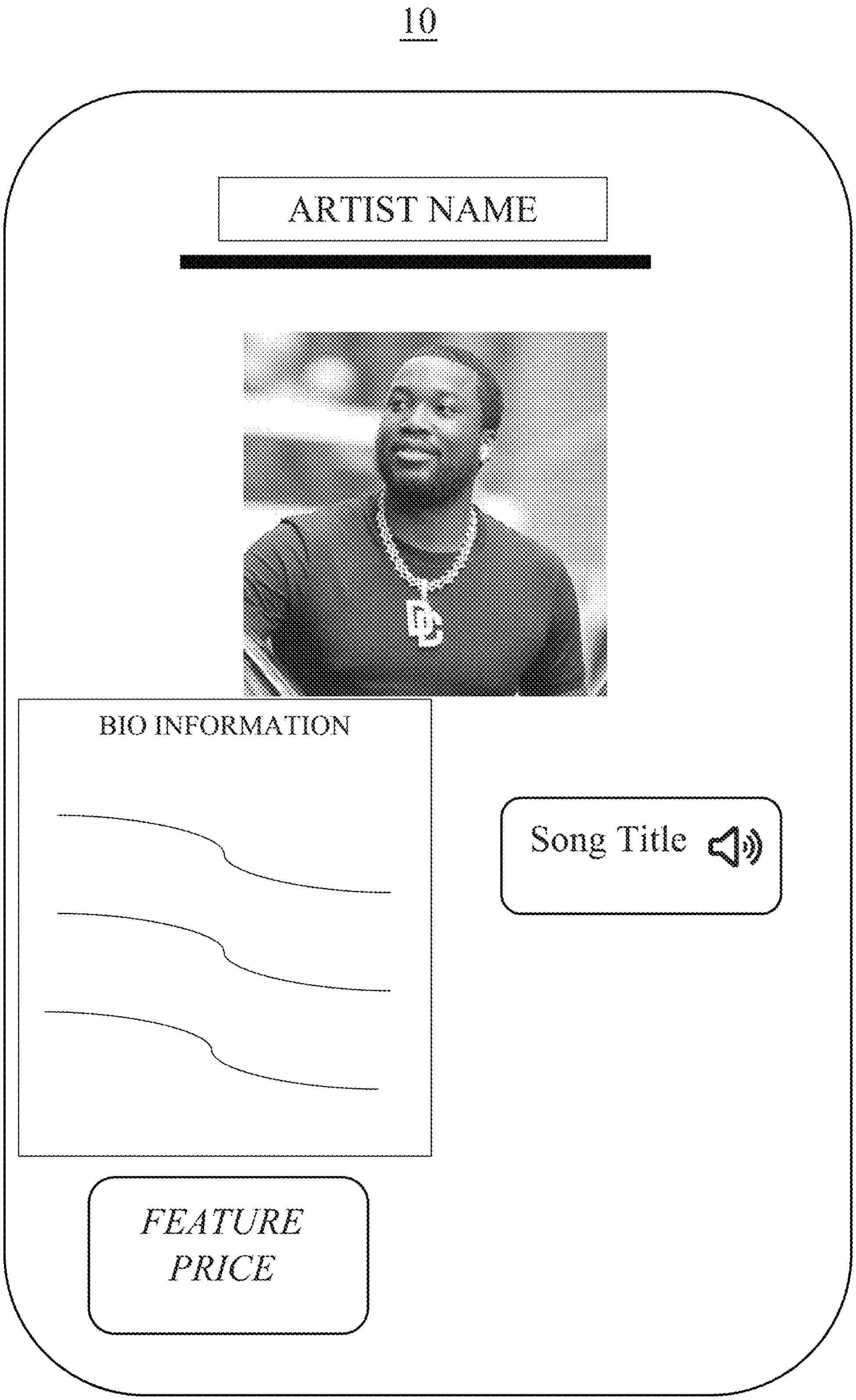
FIG. 10 shows an example artist page for a musician and artist collaboration mobile app, according to one or more embodiments.

FIG. 10 shows an example artist page 10 for a musician and artist collaboration mobile app, according to one or more embodiments. The example artist page 10 is the page shown when an artist/user selects or taps on an artist's icon/photo, which takes them to the artist's profile page. The example artist page 10 includes the artist's name, a photo of the artist, a bio and an example portion of one or more songs/music to play. The artist/user may tap or select the feature price button or selection object to view the artist's price for a requested feature. As the mobile app platform is limited in functionality as compared to a computer device, the artist/user is not provided the functionality to request a feature from the mobile app and would need to logon to a computer device (e.g., a desktop, laptop, workstation, tablet, etc.).

One or more embodiments solve a problem which has discouraged many artists from even attempting to solicit a feature from an established artist. If you understand how the traditional methods of soliciting a feature works, often times the only point person between a little or unknown artist and a well-known artist is a booking agent that is often responsible for many other tasks as well as many other artists; meaning a feature request from an unknown artist is at the bottom of the "to do" list. This lack of priority means that a little known or unknown artist will always have a harder, more time consuming and stressful time trying to obtain a feature; and that is assuming one can even figure out how to get in touch with the agent. Some embodiments consolidate and speed up the entire process while cutting out the middleman and connecting you directly to the source via the corroboration platform and mobile app. It should be noted that many members may be well-known artists that each seek other well-known artists for collaboration. Additionally, multiple artists may combine where each contributes a feature to the original uploaded way file to result in a combination of features compiled for a member requesting the features.

Some embodiments include a platform that an artist that is considered to be established enough that their presence would attract other users to the platform, and they would be featured on the platform (e.g., with no initial or annual credits or fees). Users subscribing to the platform may be charged an initial credit or fee (e.g., $350.00 US, etc.). Users may also pay an annual credit or fee (e.g., $350.00 US, etc.) for as long as they utilize the platform. Every artist requesting a feature may pay a service credit or fee (e.g., 3%, etc.). Every artist who is being requested for a feature may be charged a service credit or fee (e.g., 7%, etc.) that is automatically deducted from the funds they receive for the feature. Any denied feature request, unanswered request, or denial to accept a finished feature results in the artist being refunded the amount they paid (e.g., minus the service credit or fee, etc.). One embodiment provides direct access to every artist in the world. One embodiment provides the process of exchanging features to be executed in a much faster and less bureaucratic form. One embodiment provides an artist an exponential increase in the revenue they may generate from providing musical features. Some embodiments eliminate the barrier of distance by allowing artists to collaborate, give and collect compensation with artists on the other side of the world via the platform. One embodiment highly increases the probability of unknown artists to catch the attention of well-known or even the biggest artist in the world. In one embodiment, suggestions from the well known artist may be provided if they themselves are not interested in providing the feature or are currently unavailable. Some embodiments provide that the well-known artist may request the collaboration of other well-known artists in addition to themselves with ease by making selections and clicking on a button.

Some embodiments provide a vetting process, and direct recruitment methods that guarantee customers with at or close to 100% certainty that every profile on the platform is in fact directly linked to the artist displayed.

One or more embodiments provide virtual, real, or a combination of professional customer service teams that assist every customer's needs. In one example embodiment, there are four instances in which refunds are issued to users (for the money they paid for a feature): 1) if the artist that the user requested denies the feature, the user is refunded the amount they paid minus the service credit or fee; 2) if the artist that the user requested does not accept nor deny the feature within the a particular time period, (e.g., three weeks, etc.) the user is refunded the amount they paid minus the service credit or fee; 3) if the artist that the user requested for a feature accepts the feature but does not return the finished way file within the given time period, the user is refunded the full amount they paid including the service fee they initially paid; and 4) if the artist that the user requested for a feature completes and re-submits the way file to the user, but upon review the user is unsatisfied with the finished product, denies the feature, and the artist fails to revise the feature that is acceptable to the user, the user is refunded the amount they paid minus the service credit or fee.

Some embodiments provide a specialized and unique niche in the market of features in that it will be the only platform that allows artists to fully collaborate and collect entirely via the web. Another key point that distinguishes the platform from conventional methods and websites is that it provides a complete index containing every artist from every genre in the world, and due to the convenience that the platform provides, it inherently increases the chances of an artist actually and successfully getting the features by consolidating all the time consuming variables within the traditional form of soliciting a feature. The platform provides the next best thing to speaking to the artist directly.

One or more embodiments provide a method of marketing by using proprietary and extensive contacts and connections to directly recruit as many established artists as possible to be featured on the platform. Recruiting the top tier artists should be facilitated by the fact that the platform provides a new and fast-paced revenue stream. Eventually the platform may obtain record label representatives to broker agreements to have all their artists featured on the platform and be able to facilitate cleared features.

Figure 11:
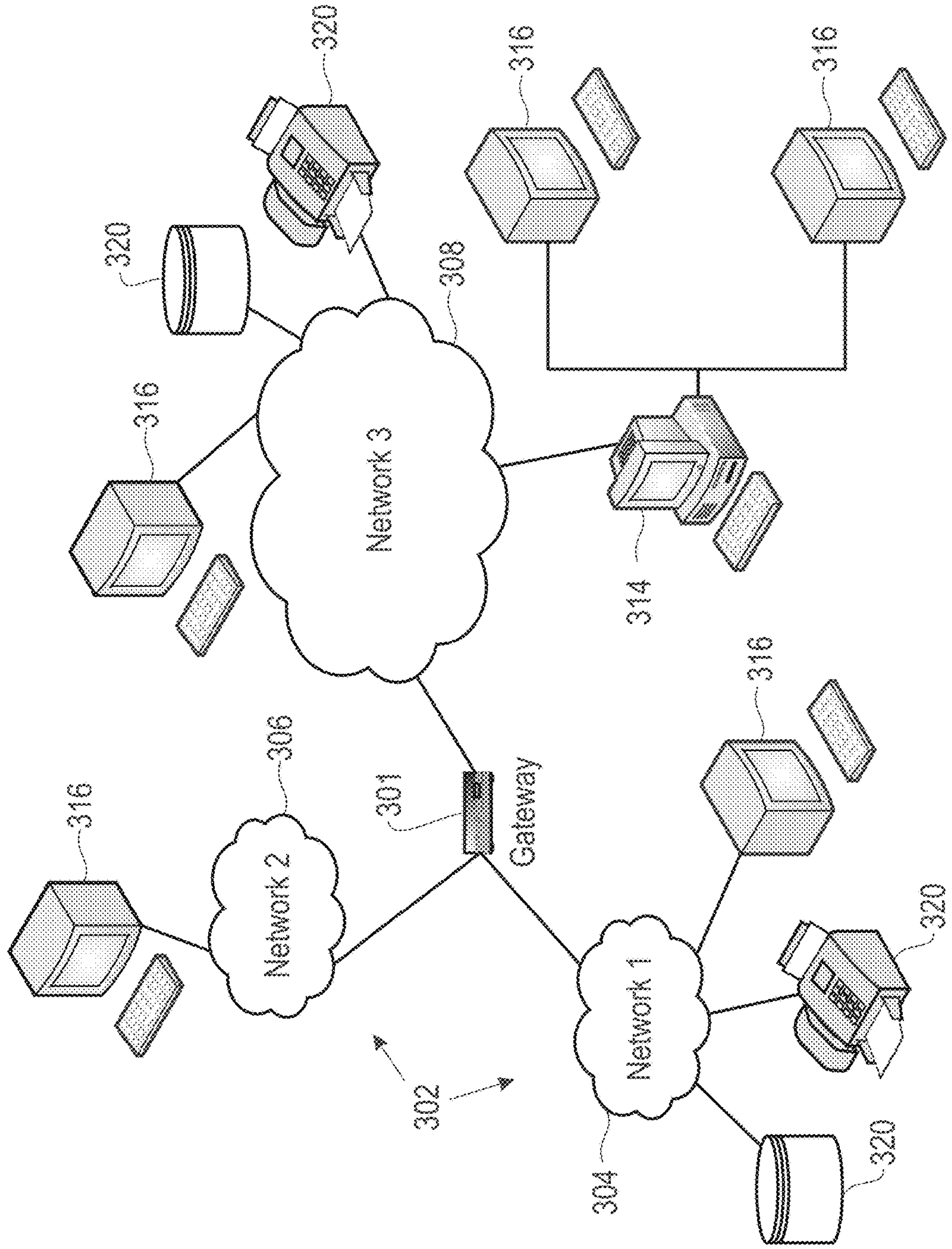
FIG. 11 is a network architecture of a system for musician and artist collaboration platform and mobile application, according to an embodiment.

FIG. 11 is a network architecture of a system 300 for musician and artist collaboration platform and mobile application, according to an embodiment. As shown in FIG. 11, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 12:
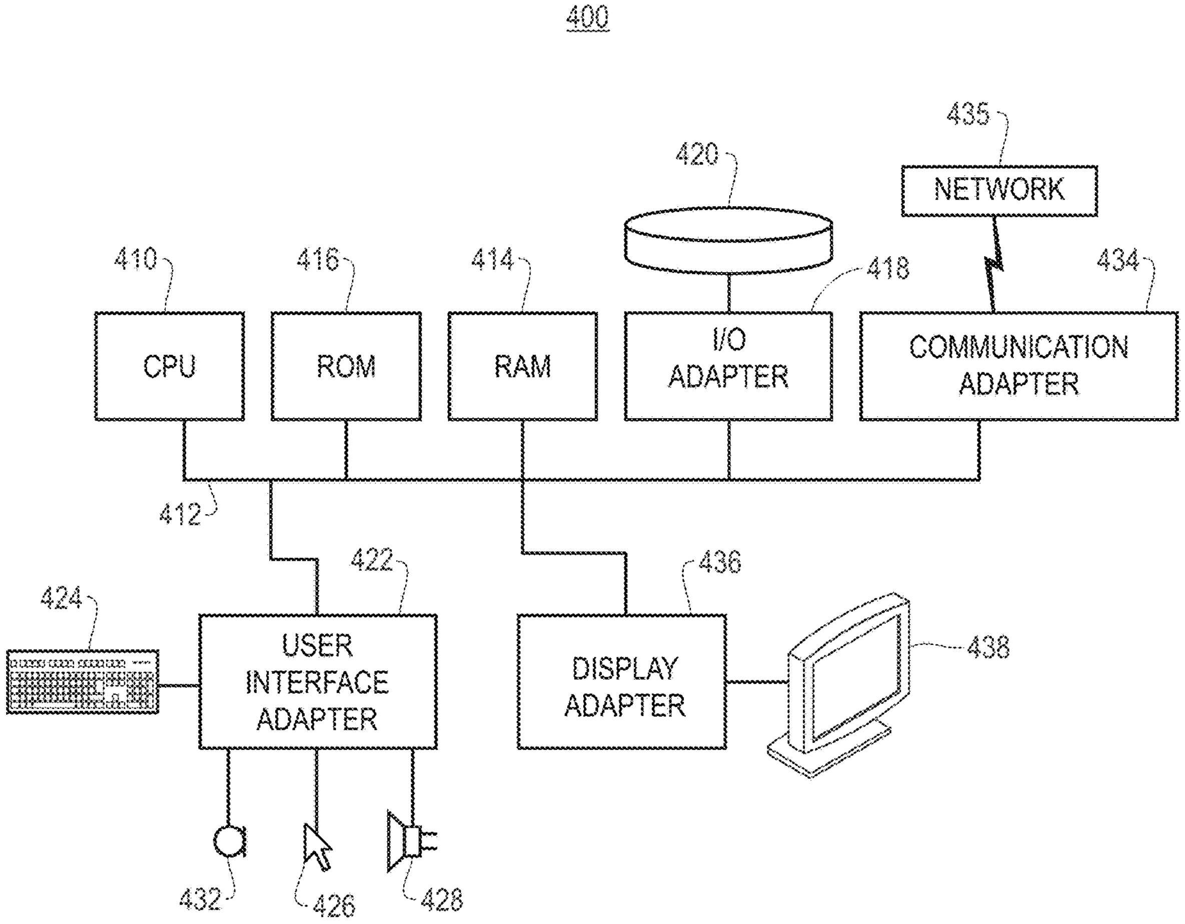
FIG. 12 shows a representative hardware system environment associated with a user device and/or server of FIG. 3, in accordance with one embodiment.

FIG. 12 shows a representative hardware system 400 environment associated with a user device 316 and/or server 314 of FIG. 11, in accordance with one embodiment. In one example, a hardware configuration includes a workstation having a central processing unit 410, such as a microprocessor, and a number of other units interconnected via a system bus 412. The workstation shown in FIG. 12 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 13:
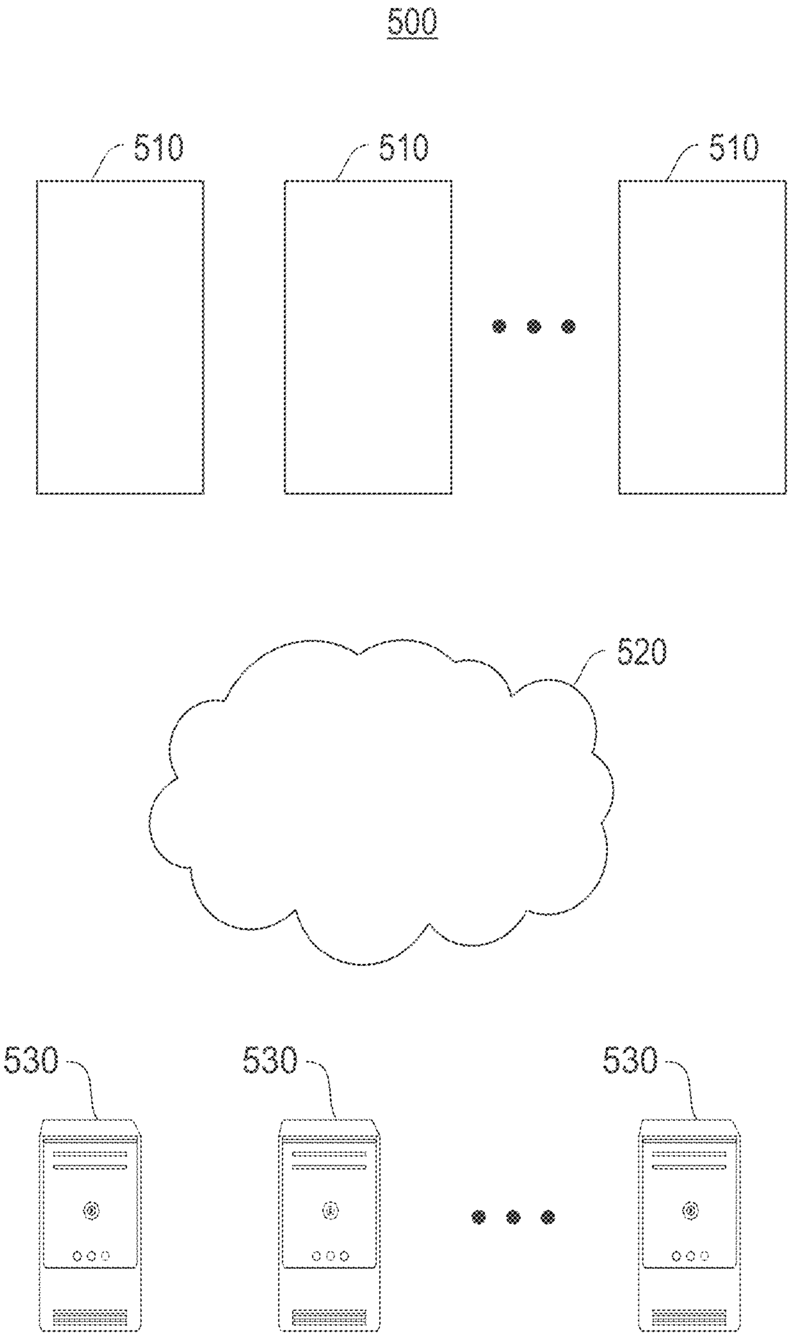
FIG. 13 is a block diagram illustrating a distributed system that may be employed for musician and artist collaboration platform and mobile app processing, according to one embodiment.

FIG. 13 is a block diagram illustrating a distributed system 500 that may be employed for musician and artist collaboration platform and mobile application processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices are provided with cloud services from the servers 530 through the cloud or resource sharing environment 520.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of pre-AIA 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A musician collaboration system, comprising:
- a memory configured to store instructions; and
- a processor configured to execute the instructions to:
  - receive a request for providing a feature, the request including receiving a first content file associated with the feature;
  - transmitting a message informing the request;
  - one of transmitting an acceptance of the request and a denial of the request; and
  - upon the acceptance of the request, receiving and transmitting a second content file including a version of the feature;
- wherein the collaboration system includes membership for a first member seeking to receive the version of the feature from a second member seeking to provide the version of the feature, the first content file comprises a first portion of a musician-based collaboration from a first artist, the second content file comprises a second portion of the musician-based collaboration from a second artist, the first member is the first artist, and the second member is the second artist, the acceptance of the request further comprises receiving a credit from the first artist seeking to receive the version of the feature, and upon acceptance of the second content file including the version of the feature, a credit is provided to the second artist that provided the version of the feature.

2. The system of claim 1, wherein the first content file is one of a musical content file including vocals, a musical content file including instrumentals, or a combination thereof, and the first content file is created by the first artist.

3. The system of claim 1, wherein the second content file is one of a musical content file including vocals, a musical content file including instrumentals, or a combination thereof, and the second content file is created by the second artist.

4. The system of claim 1, wherein content of the feature comprises one or more of vocals, instrumentals, lyrics, composition, mixing and arrangement of content.

5. The system of claim 1, wherein the first artist and the second artist are both musical artists, and the second artist has a larger following than the first member.

6. The system of claim 5, wherein the system is accessed using the Internet and is accessed via a computing device or a mobile smart phone.

7. A computer program product for member collaboration system, the computer program product comprising a computer readable storage medium having program instructions embodied therewith, the program instructions executable by a processor to cause the processor to:
- receive, by the processor, a request for providing a feature, the request including receiving a first content file associated with the feature;
- transmit, by the processor, a message informing the request;
- transmit, by the processor, one of an acceptance of the request and a denial of the request; and
- upon the acceptance of the request, receive and transmit, by the processor, a second content file including a version of the feature;
- wherein the collaboration system includes membership for a first member seeking to receive the version of the feature from a second member seeking to provide the version of the feature, the first content file comprises a first portion of a musician-based collaboration from a first artist, and the second content file comprises a second portion of the musician-based collaboration from a second artist, the first member is the first artist, and the second member is the second artist, the acceptance of the request further comprises receiving a credit from the first artist seeking to receive the version of the feature, and upon acceptance of the second content file including the version of the feature, the processor transfers a credit to the second artist that provided the version of the feature.

8. The computer program product of claim 7, wherein the first content file is one of a musical content file including vocals, a musical content file including instrumentals, or a combination thereof, and the first content file is created by the first artist.

9. The computer program product of claim 7, wherein the second content file is one of a musical content file including vocals, a musical content file including instrumentals, or a combination thereof, and the second content file is created by the second artist.

10. The computer program product of claim 7, wherein content of the feature comprises one or more of vocals, instrumentals, lyrics, composition, mixing and arrangement of content.

11. The computer program product of claim 7, wherein the first artist and the second artist are both musical artists, and the second artist has a larger following than the first member.

12. The computer program product of claim 11, wherein the system is accessed using the Internet via a computing device or a mobile smart phone.

* * * * *